United States Patent
Loeschner et al.

(10) Patent No.: US 8,523,453 B2
(45) Date of Patent: Sep. 3, 2013

(54) MULTIPLE-ROW LARGE ROLLER BEARING, ESPECIALLY AXIAL RADIAL BEARING FOR THE MAIN ARRANGEMENT OF BEARINGS OF THE ROTOR SHAFT OF A WIND POWER INSTALLATION

(75) Inventors: Tim Loeschner, Wuerzburg (DE); Rudolf Zeidlhack, Werneck (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 788 days.

(21) Appl. No.: 12/597,193

(22) PCT Filed: Apr. 16, 2008

(86) PCT No.: PCT/DE2008/000643
§ 371 (c)(1),
(2), (4) Date: Apr. 13, 2010

(87) PCT Pub. No.: WO2008/131721
PCT Pub. Date: Nov. 6, 2008

(65) Prior Publication Data
US 2010/0215307 A1    Aug. 26, 2010

(30) Foreign Application Priority Data

Apr. 25, 2007   (DE) .......................... 10 2007 019 482

(51) Int. Cl.
*F16C 19/54*  (2006.01)
*F16C 19/32*  (2006.01)
*F16C 33/58*  (2006.01)
*F16C 35/08*  (2006.01)

(52) U.S. Cl.
USPC ........... 384/571; 384/455; 384/548; 384/618; 384/619

(58) Field of Classification Search
USPC ................. 384/455–456, 512, 519, 542, 548, 384/565, 571, 597, 604, 621, 618–619
See application file for complete search history.

(56) References Cited

U.S. PATENT DOCUMENTS

| 2,292,988 A | * | 8/1942 | Bloomfield et al. ...... 192/45.006 |
| 2,553,536 A | * | 5/1951 | Frenkel .......................... 384/515 |
| 2,594,578 A | * | 4/1952 | McNicoll ....................... 384/455 |
| 3,144,278 A | * | 8/1964 | Pohler et al. .................. 384/493 |

(Continued)

FOREIGN PATENT DOCUMENTS

| DE | 2351876 A | * | 5/1975 |
| DE | 20 2007 011 577 | | 10/2007 |
| EP | 1316743 A2 | * | 6/2003 |
| JP | 2003042149 A | * | 2/2003 |

*Primary Examiner* — Marcus Charles
(74) *Attorney, Agent, or Firm* — Lucas & Mercanti, LLP

(57) ABSTRACT

An axial radial bearing for a rotor shaft of a wind power installation, which has a vertical circular outer disk, inner ring arranged coaxially to the outer disk, and two circular shaft washers axially arranged on both sides of the outer disk. At least one row of rolling bodies, held at equal distances by a bearing cage, extends between the shaft washers and outer disk, forming the rolling bearings for receiving axial forces, while at least one other row of rolling bodies, optionally held at equal distances by another bearing cage, is arranged between the outer disk and inner ring, forming a third rolling bearing for receiving radial forces. The two rolling bearings for receiving radial forces are formed by two tapered roller bearings oriented towards the longitudinal axis of the bearing by the small front sides, or by a double-row angular ball bearing or by two axial ball bearings.

4 Claims, 3 Drawing Sheets

(56) References Cited

U.S. PATENT DOCUMENTS

| | | | |
|---|---|---|---|
| 3,652,141 A * | 3/1972 | Husten et al. | 384/455 |
| 3,830,553 A * | 8/1974 | Schurger et al. | 384/613 |
| 4,126,361 A * | 11/1978 | Bottner et al. | 384/455 |
| 4,129,343 A * | 12/1978 | Janssen | 384/558 |
| 4,252,333 A * | 2/1981 | Vogel | 279/72 |
| 4,269,460 A * | 5/1981 | Orain | 384/615 |
| 4,463,995 A * | 8/1984 | Andree | 384/624 |
| 4,512,525 A * | 4/1985 | Cameron | 241/207 |
| 4,615,627 A * | 10/1986 | Schilling et al. | 384/551 |
| 5,675,202 A * | 10/1997 | Zenmei et al. | 310/100 |
| 6,575,476 B2 * | 6/2003 | McFadden | 279/16 |
| 6,679,634 B2 * | 1/2004 | Plesh, Sr. | 384/542 |
| 6,857,787 B1 * | 2/2005 | Meier et al. | 384/619 |
| 6,932,736 B2 * | 8/2005 | Yamamoto | 384/571 |
| 2001/0041643 A1 * | 11/2001 | Yamamoto | 476/40 |
| 2006/0219037 A1 * | 10/2006 | Inose et al. | 74/424 |
| 2012/0228571 A1 * | 9/2012 | Curchod | 254/416 |

* cited by examiner

MULTIPLE-ROW LARGE ROLLER BEARING, ESPECIALLY AXIAL RADIAL BEARING FOR THE MAIN ARRANGEMENT OF BEARINGS OF THE ROTOR SHAFT OF A WIND POWER INSTALLATION

CROSS REFERENCE TO RELATED APPLICATIONS

This application is a 371 of PCT/EP2008/010374 filed Dec. 8, 2008, which in turn claims the priority of DE 10 2007 063 160.1 filed Dec. 29, 2007, the priority of both applications is hereby claimed and both applications are incorporated by reference herein.

FIELD OF THE INVENTION

The invention relates to a multi-row large rolling bearing according to the features forming the preamble of patent claim 1, and may particularly advantageously be realized in an axial-radial bearing for the main bearing arrangement of the rotor shaft of a wind power installation or in rotary table bearings or rotary joints.

BACKGROUND OF THE INVENTION

Large rolling bearings which are suitable for the main bearing arrangement of the rotor shaft of a wind power installation, or else for rotary table bearing arrangements in machine tools, are usually produced as ready-to-install bearing units for combined loadings with high demands on running precision, and are designed either as axial-radial bearings or as axial-angular-contact ball bearings depending on rotational speed and duty cycle. Both bearing types absorb radial and axial loads on both sides and also tilting moments, and are preloaded radially and axially without play. While axial-radial bearings are used predominantly in standard applications with low rotational speeds and are generally distinguished by a higher friction torque which increases with rotational speed, axial-angular-contact ball bearings are very well suited to applications involving high rotational speeds, and are distinguished by distinctly low friction and low lubricant consumption.

Large rolling bearings of said type are known inter alia from the applicant's catalog "Wälzlager" ["Rolling bearings"] from January 2006 and are described in the stated embodiments as axial-radial bearings and as axial-angular-contact ball bearings, for example on pages 990 to 1019.

Here, the axial-angular-contact ball bearings shown are composed substantially of a single-part or two-part inner bearing ring and an outer bearing ring and of a multiplicity of bearing balls arranged adjacent to one another in two rows which are inclined in relation to one another, which bearing balls roll with a defined pressure angle with their running surfaces on a plurality of raceways arranged adjacent to one another on the outer side of the inner bearing ring and on the inner side of the outer bearing ring.

In contrast, the axial-radial bearings illustrated are composed substantially of a vertically-arranged circular-ring-shaped outer disk, an inner ring arranged coaxially with respect to said outer disk, as well as two circular-ring-shaped shaft disks arranged axially adjacent to the outer disk on both sides, with one row of rolling bodies each, held at uniform intervals by one bearing cage each and designed as bearing needles or cylindrical rollers, rolling between the two shaft disks and the outer disk and forming a first and a second rolling bearing for absorbing axial forces. Furthermore, another row of rolling bodies, usually held at uniform intervals by another bearing cage and likewise designed as bearing needles or cylindrical rollers, is arranged between the outer disk and the inner ring, which row finally forms a third rolling bearing for absorbing radial forces.

Furthermore, rotary table bearings designed as double-row angular-contact roller bearings are also known in which, as rolling bodies, use is made of two rows of cylindrical rollers which are inclined in relation to one another instead of two rows of bearing balls.

A disadvantage of said axial-radial bearings has however proven to be that the rolling bodies designed as bearing needles or cylinder rollers, in the two rolling bearings for absorbing axial forces have unfavorable kinematics, since said rolling bodies are arranged with their end sides on different pitch circles on account of their axial arrangement, and thereby seek to roll at different rotational speeds on their raceways at said end sides. However, since this is naturally not possible and the rolling bodies are also guided only by their bearing cages, skew or permanent tilting movements of the bearing needles or cylindrical rollers in their cage pockets occurs, as a result of which tilting movements, high constraining forces act on the bearing cages, and which tilting movements cause a relatively high friction moment and an increased generation of heat in the bearing. Here, the generation of heat in the bearing and/or the constraining forces on the bearing cages may briefly become so high as to result in either overheating and inadequate lubrication or in breakage of the bearing cages as a result of overloading, which in both cases leads to premature failure of the axial-radial bearing. Such unfavorable kinematics may duly be eliminated by using the described axial-angular-contact ball bearings with bearing balls, which naturally have more expedient kinematics, instead of the likewise described axial-radial bearings with cylindrical rollers, but such axial-angular-contact ball bearings generally do not have the required load capacity to be able to withstand extremely high forces prevailing, for example, in the main bearing arrangement of a rotor shaft of a wind power installation.

BRIEF SUMMARY OF THE INVENTION

Object of the Invention

Taking the described disadvantages of the solutions of the known prior art as a starting point, the object on which the invention is based is therefore that of designing a multi-row large rolling bearing, in particular axial-radial bearing for the main bearing arrangement of the rotor shaft of a wind power installation, in which the rolling bodies of the two rolling bearings for absorbing axial forces have more favorable kinematics and guidance, and thereby contribute to a longer service life of the axial-radial bearing, and which is at the same time suitable for very high loads.

DESCRIPTION OF THE INVENTION

Said object is achieved according to the invention, with a multi-row large rolling bearing, in which two rolling bearings for absorbing axial forces are formed either by two tapered-roller bearings whose rolling bodies, which are designed as tapered rollers, are aligned with their smaller end sides, in each case, toward the bearing longitudinal axis, or in that the two rolling bearings are formed by a double-row angular-contact ball bearing in which the two rows of the rolling bodies, which are designed as bearing balls, are inclined in relation to one another with defined pressure angles, or in that the two rolling bearings are formed by two axial ball bearings in which the two rows of the rolling bodies, which are designed as bearing balls, are arranged on opposite pitch circles with equal diameters.

The invention is therefore based on the realization that, by exchanging the rolling bodies for the two rolling bearings for absorbing axial forces, which rolling bodies have hitherto been designed as cylindrical rollers or bearing needles, for rolling bodies designed as tapered rollers or bearing balls, it is possible in a simple manner to improve the kinematics of said rolling bearings while maintaining the same load capacity, in such a way that the rolling bodies roll on their raceways with the same rotational speeds on all their circumferential surfaces, such that skew or permanent tilting movements of the rolling bodies in their cage pockets, and the associated friction losses together with the increased generation of heat in the bearing, are now eliminated.

Preferred configurations and advantageous refinements of all the embodiments of the multi-row large rolling bearing designed according to the invention are described in the subclaims.

According to another embodiment, it is provided in the large rolling bearing designed according to the invention that, with the two rolling bearings for absorbing axial forces designed as tapered-roller bearings, each row of the rolling bodies, which are designed as tapered rollers, rolls in one raceway each which is delimited by at least one rim and which is formed entirely either into the inner sides of the shaft disks or into the outer sides of the outer disk. In this way, one part of the raceways is of planar design and therefore permits the adjustment of the radial preload both of the rolling body rows of the rolling bearing for absorbing radial forces and also of the two rolling body rows of the rolling bearings for absorbing axial forces, without constraining forces or elastic deformations. Here, the at least one rim, which delimits each raceway, is operatively connected, in each case, to the larger end sides of the tapered rollers, and has the advantage that the guidance of the tapered rollers in their raceways is provided no longer by means of the bearing cage, but rather by means of said rim, and the bearing cage has merely the function of a spacer with which the tapered rollers are held at uniform intervals to one another in the circumferential direction.

Proceeding from the design of the two rolling bearings for absorbing axial forces as a double-row angular-contact rolling bearing, it is in contrast provided according to another embodiment that each row of the rolling bodies, which are designed as bearing balls, of the double-row angular-contact ball bearing for absorbing axial forces rolls in in each case two groove-shaped raceways which, on the one hand, are formed obliquely into the inner sides and into the end sides of the shaft disks and, on the other hand, obliquely into the outer sides and into the end side of the outer disk. As is the case with the above-described design of the two rolling bearings for absorbing axial forces as tapered-roller bearings, the groove shape of the raceways of the rolling bodies therefore ensures in this embodiment, too, that the guidance of the rolling bodies is provided no longer by means of the bearing cage but rather by means of the raceways of said rolling bodies, and the bearing cage has only the function of a spacer, by means of which the bearing balls are held at uniform intervals with respect to one another in the circumferential direction.

Similar to the design described above, in the case of the two rolling bearings for absorbing axial forces being designed as axial ball bearings, it is also an advantageous refinement, that each row of the rolling bodies, which are designed as bearing balls, of the two axial ball bearings roll in two groove-shaped raceways, but with the groove-shaped raceways being formed here on the one hand only into the inner sides of the shaft disks and on the other hand only into the outer sides of the outer disk. As in the other embodiments, it is also the case in this embodiment that the groove shape of the raceways of the rolling bodies ensures that the guidance of the rolling bodies is provided no longer by means of the bearing cage, but rather by means of the raceways of said rolling bodies, and the bearing cage has only the function of a spacer, by means of which the tapered rollers are held at uniform intervals with respect to one another in the circumferential direction.

An expedient refinement, which applies to all three of the above-described embodiments, of the large rolling bearing designed according to the invention, is furthermore, that the inner ring and the shaft disks are formed either by separate individual parts or the inner ring is formed in one piece with the one shaft disk and the other shaft disk forms a separate component. Here, the design of the inner ring and shaft disks as separate components has proven to be advantageous with regard to the production costs of the individual parts and also with regard to easier assembly and disassembly of the axial-radial bearings, while the single-part design of the inner ring with one of the shaft disks has advantages with regard to the axial dimensional accuracy of the axial-radial bearing as a result of the shorter tolerance chain, and with regard to a particularly high degree of axial tilting resistance. Also conceivable in this connection, however, would be a design of the axial-radial bearing in which one half of the inner ring including one half of the raceway for the cylindrical rollers of the rolling bearing for absorbing radial forces is integrated into the one shaft disk, while the other half of the inner ring and the other half of the raceway are formed in one piece with the other shaft disk. In the case of the separate design of the inner ring and shaft disks, the most advantageous option for connecting the individual parts to one another has proven to be a plurality of uniformly circumferentially distributed screw connections, while in case of the single-part design of the inner ring with one of the shaft disks, the most suitable option is a non-positively locking connection of all the individual parts by means of clamping rings which, by means of a press-fitting connection with the mounted shaft, brace the one shaft disk against the inner ring which is combined with the other shaft disk.

Finally, it is also proposed, as an advantageous refinement of all the embodiments of the large rolling bearing designed according to the invention, that, to set the axial play of the rolling bearings for absorbing axial forces which are designed as tapered-roller bearings, angular-contact ball bearings or axial ball bearings, either the inner ring is formed with a defined width by means of grinding of at least one of its axial sides, or a spacer ring with a defined width is arranged between the inner ring and at least one of the shaft disks. As an alternative to the grinding of one of the axial sides of the inner ring to a defined width fo setting the axial play, it is also possible, however, to perform corresponding cutting by machining on both axial sides of the inner ring or else on both inner sides of the shaft disks, or to influence the axial dimension of said inner ring or shaft disks by means of coatings. However, since such machining is relatively complex and expensive in production terms, setting the axial play by means of a spacer ring has proven to be the most advantageous option both for cost reasons and also because, any machining errors in the width of the spacer ring can also be compensated in a relatively simple manner by exchanging for a suitable spacer ring in this way.

In summary, the axial-radial bearing designed according to the invention, in all the described embodiments, has the advantage over the axial-radial bearings known from the prior art that the rolling bodies, which are designed as tapered rollers or as bearing balls, of the two rolling bearings for absorbing axial forces, have more favorable kinematics than the cylindrical rollers or bearing needles used previously, and have rim guidance instead of cage guidance, such that permanent tilting movements of the rolling bodies in their cage pockets, with friction losses and increased heat generation in the bearing and high constraining forces on the bearing cages thereof, are effectively avoided and the service life of the axial-radial bearing is extended significantly. Since, as a rolling bearing for absorbing radial forces, use is made as before of a single-row, solid-roller cylindrical roller bearing or cylindrical roller bearing formed with a bearing cage, the axial-radial bearing is simultaneously also suitable for very high loads.

Furthermore, it is considered to be self-evident that a person skilled in the art will also take into consideration equivalent solutions to the described bearing designs, in which for example the shaft disks are connected not to the inner ring but rather to the outer ring of the axial-radial bearing, such that the rolling bodies used according to the invention for the rolling bearings for absorbing axial forces may alternatively roll in corresponding raceways between the shaft disks and the then circular-ring-shaped inner ring, and the described single-part or multi-part design of inner ring and shaft disks is then used on the outer ring of the axial-radial bearing. It is likewise self-evident that both the inner ring and also the outer disk of the axial-radial bearing may optionally be connected to the surrounding structure, such as, for example, the machine support of the wind power installation, and that both the rolling bearing for absorbing radial forces and also the rolling bearings for absorbing axial forces may also be not only of single-row design but rather also of multi-row design, if required.

Mixed forms of the described embodiments for the rolling bearings for absorbing axial forces are also conceivable, if required, such that said rolling bearings may, for example, in situations with bearing forces prevailing axially from one side, be formed on the one hand, as tapered-roller bearings and, on the other hand, as axial or angular-contact ball bearings, or in some other combination.

BRIEF DESCRIPTION OF THE DRAWINGS

The multi-row large rolling bearing designed according to the invention is explained in more detail below on the basis of three preferred embodiments with reference to the appended drawings, in which.

DETAILED DESCRIPTION OF THE DRAWINGS

Figure 1:
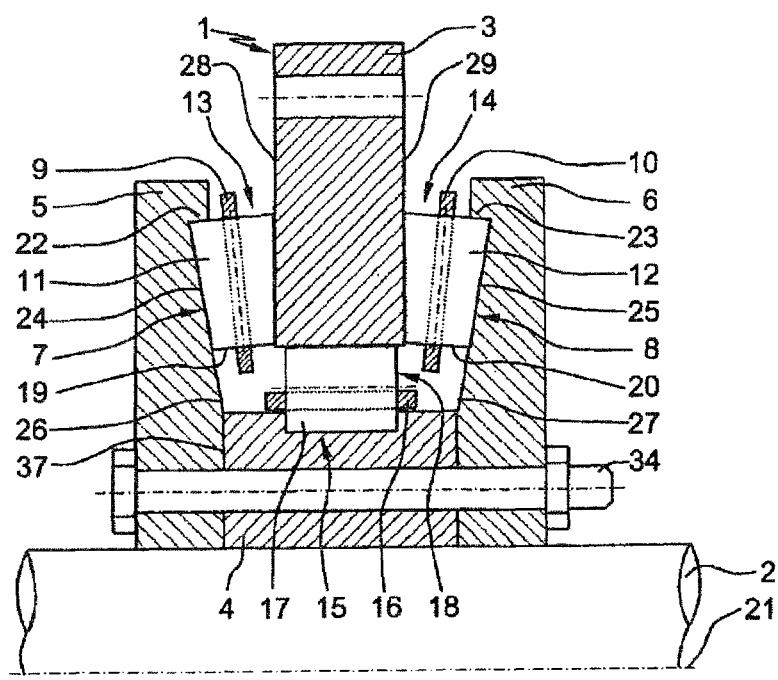
FIG. 1 shows a partial view of a cross section through a first embodiment of a multi-row large rolling bearing designed according to the invention.

FIGS. 1 to 6 illustrate in each case a multi-row large rolling bearing designed as a three-row axial-radial bearing 1, which is substantially composed of a vertically-arranged circular-ring-shaped outer disk 3, an inner ring 4 arranged coaxially with respect to said outer disk 3, and two circular-ring-shaped shaft disks 5, 6 arranged axially adjacent to the outer disk 3 on both sides. Here, as can be clearly seen, in each case one row 7, 8 of rolling bodies 11, 12, held at uniform intervals by in each case one bearing cage 9, 10, rolls between the two shaft disks 5, 6 and the outer disk 3, such that said rows 7, 8 form a first and a second rolling bearing 13, 14 for absorbing axial forces. Furthermore, a further row 15 of rolling bodies 17, held at uniform intervals by a further bearing cage 16, is arranged between the outer disk 3 and the inner ring 4, said rolling bodies 17 being designed as cylindrical rollers and forming a third rolling bearing 18 for absorbing radial forces.

Figure 2:
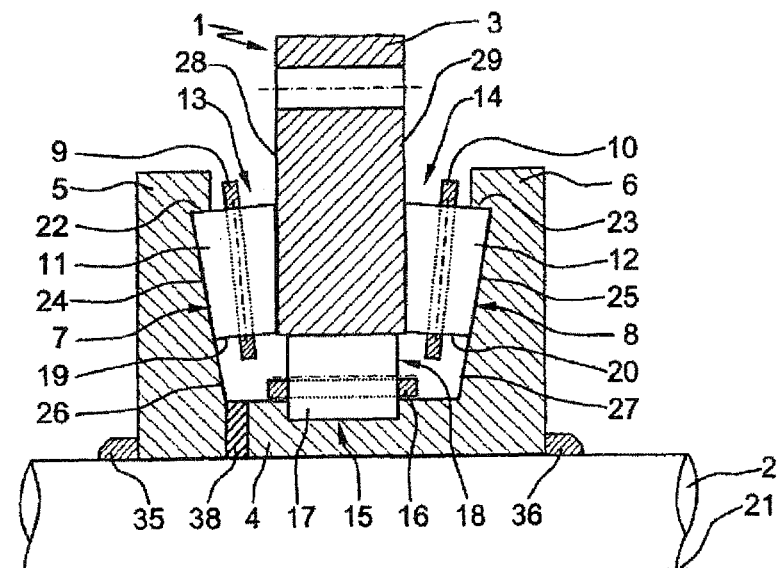
FIG. 2 shows a partial view of a cross section through a variant of the first embodiment of a multi-row large rolling bearing designed according to the invention.

It can also be seen from FIGS. 1 and 2, that the two rolling bearings 13, 14 for absorbing axial forces are formed according to the invention, in a first kinematically optimized embodiment, by two tapered-roller bearings whose rolling bodies 11, 12, which are designed as tapered rollers, are each aligned with their smaller end sides 19, 20 toward the bearing longitudinal axis 21. Here, each row 7, 8 of the rolling bodies 11, 12, which are designed as tapered rollers, of the two rolling bearings 13, 14 for absorbing axial forces rolls in a raceway 24, 25, each, which is delimited by a rim 22, 23 and which is formed entirely into the inner sides 26, 27 of the shaft disks 5, 6. Here, the rim 22, 23, delimited each raceway 24, 25, is operatively connected to the larger end sides (not shown in any more detail) of the rolling bodies 11, 12, which are designed as tapered rollers, and said rim 22, 23 has the effect that the guidance of the tapered rollers in their raceways 24, 25 is provided by means of said rim 22, 23 and not by means of the bearing cage 9, 10, which serves merely as a spacer.

Figure 3:
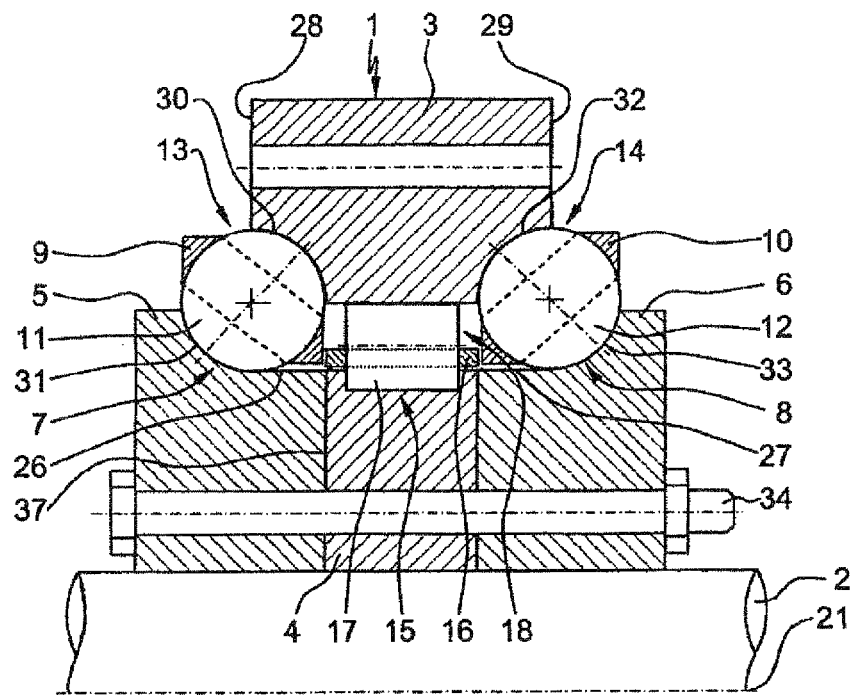
FIG. 3 shows a partial view of a cross section through a second embodiment of a multi-row large rolling bearing designed according to the invention.
Figure 4:
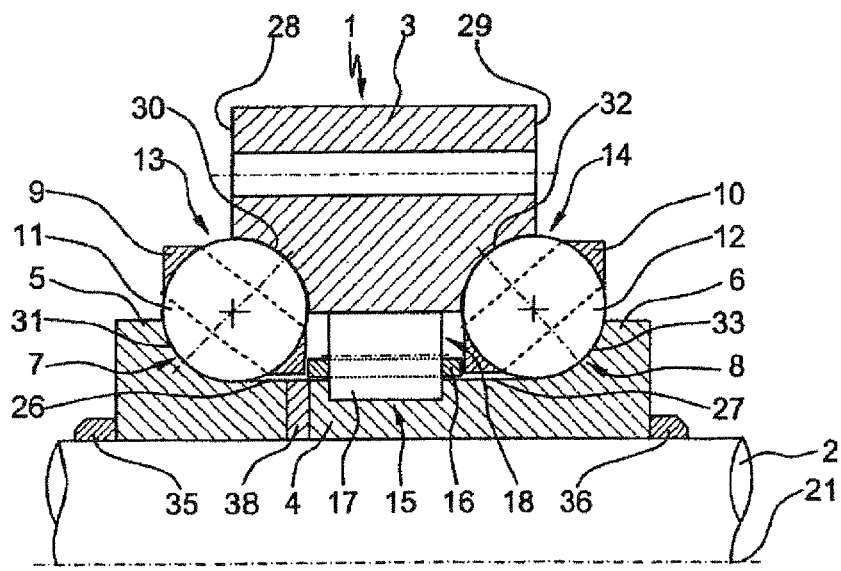
FIG. 4 shows a partial view of a cross section through a variant of the second embodiment of a multi-row large rolling bearing designed according to the invention.

In contrast, in FIGS. 3 and 4, it is illustrated that the two rolling bearings 13, 14 for absorbing axial forces are formed according to the invention, in a second kinematically optimized embodiment by a double-row angular-contact ball bearing in which the two rows 7, 8 of the rolling bodies 11, 12, which are designed as bearing balls, are inclined in relation to one another with defined pressure angles in an O-arrangement. Here, each row 7, 8 of the rolling bodies 11, 12, which are designed as bearing balls, of the angular-contact ball bearing for absorbing axial forces rolls, in two groove-shaped raceways 30, 31 and 32, 33 which are formed, on the one hand, obliquely into the inner sides 26, 27 and into the end sides (not shown in any more detail) of the shaft disks 5, 6 and, on the other hand, obliquely into the outer sides 28, 29 and into the end side (likewise not shown in any more detail) of the outer disk 3. Therefore, in this embodiment, too, the groove shape of the raceways 30, 31, 32, 33 ensures that the guidance of the rolling bodies 11, 12 is provided no longer by means of the bearing cages 9, 10 but rather by means of the raceways 30, 31, 32, 33 of said rolling bodies 11, 12, and the bearing cages 9, 10, merely have the function of a spacer.

Figure 5:
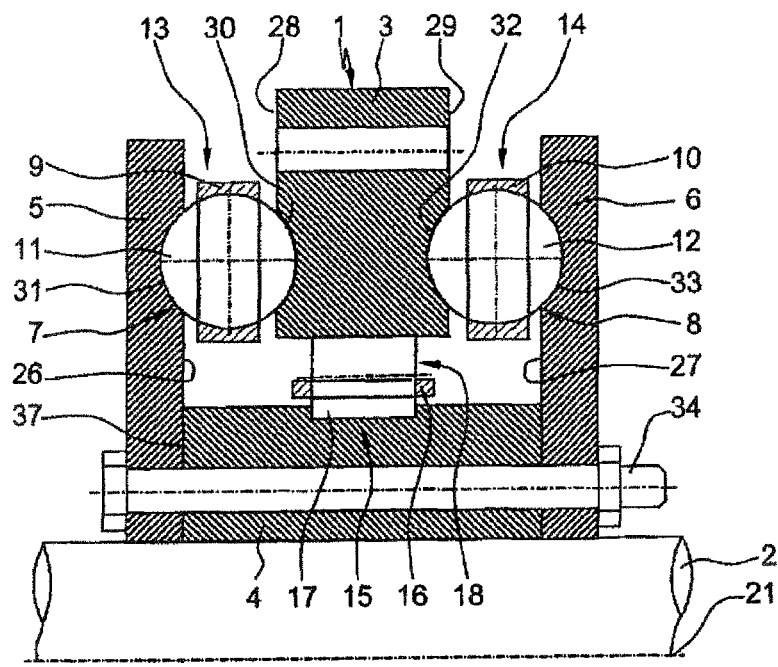
FIG. 5 shows a partial view of a cross section through a third embodiment of a multi-row large rolling bearing designed according to the invention.
Figure 6:
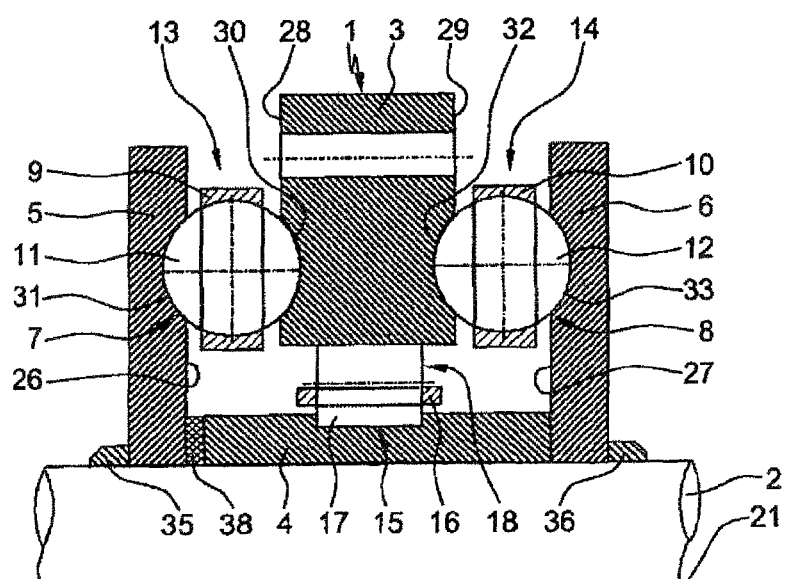
FIG. 6 shows a partial view of a cross section through a variant of the third embodiment of a multi-row large rolling bearing designed according to the invention.

In FIGS. 5 and 6, it is additionally shown that the two rolling bearings 13, 14 for absorbing axial forces are formed according to the invention, in a third kinematically optimized embodiment, by two axial ball bearings in which the two rows 7, 8 of the rolling bodies 11, 12, which are designed as bearing balls, are arranged on opposite pitch circles with equal diameters. Here, each row 7, 8 of the rolling bodies 11, 12, which are designed as bearing balls, of the axial ball bearings each roll in two groove-shaped raceways 30, 31 and 32, 33 which are formed, on the one hand, only into the inner sides 26, 27 of the shaft disks 5, 6 and, on the other hand, only into the outer sides 28, 29 of the outer disk 3. Therefore, in this embodiment, too, the groove shape of the raceways 30, 31, 32, 33 ensures that the guidance of the rolling bodies 11, 12 is provided no longer by means of the bearing cages 9, 10 but rather by means of the raceways 30, 31, 32, 33 of said rolling bodies 11, 12, and the bearing cages 9, 10, merely have the function of a spacer.

Finally, it may also be gathered from FIGS. 1, 3 and 5 that, in said embodiments, the inner ring 4 and the shaft disks 5, 6 of the axial-radial bearing 1 are formed by separate individual parts, and that all the individual parts are connected to one another in a non-positive fashion by means of screw connections 34. Furthermore, to set the axial play of the rolling bearings 13, 14 which are designed as tapered-roller bearings or angular-contact ball bearings, the inner ring 4 is machined on its axial side 37 by grinding, such that said inner ring 4 has a defined width.

In contrast, the variants shown in FIGS. 2, 4 and 6 differ from the embodiments described above in that the inner ring 4 is formed in one piece with the one shaft disk 5 and the other shaft disk 6 forms a separate component. Here, all the individual parts are connected to one another in a non-positive fashion by means of clamping rings 35, 36 which are in a press-fitting connection with the rotor shaft 2, and to set the axial play of the rolling bearings 13, 14 which are designed as tapered-roller bearings or angular-contact ball bearings, a spacer ring 38 with a defined width is arranged between the inner ring 4 and the shaft disk 5.

LIST OF REFERENCE NUMERALS

1 Axial-radial bearing
2 Rotor shaft
3 Outer disk
4 Inner ring
5 Shaft disk
6 Shaft disk
7 Row of 11
8 Row of 12
9 Bearing cage of 7
10 Bearing cage of 8
11 Rolling bodies
12 Rolling bodies
13 Rolling bearing, axial
14 Rolling bearing, axial
15 Row of 17
16 Bearing cage of 15
17 Rolling bodies
18 Rolling bearing, radial
19 End side of 11
20 End side of 12
21 Bearing longitudinal axis
22 Rim on 24
23 Rim on 25
24 Raceway for 7
25 Raceway for 8
26 Inner side of 5
27 Inner side of 6
28 Outer side of 3
29 Outer side of 3
30 Raceway for 7
31 Raceway for 7
32 Raceway for 8
33 Raceway for 8
34 Screw connection
35 Clamping ring
36 Clamping ring
37 Axial side of 4
38 Spacer ring

The invention claimed is:

1. A multi-row large rolling bearing configured as an axial-radial bearing for a main bearing arrangement of a rotor shaft of a wind power installation, comprising:
   a vertically-arranged circular-ring-shaped outer disk;
   an inner ring arranged coaxially with respect to the outer disk; and
   two circular-ring-shaped shaft disks arranged axially adjacent to the outer disk on both sides, each with at least one row of rolling bodies, each held at uniform intervals by one bearing cage, rolling between the two shaft disks and the outer disk and forming a first and a second rolling bearing for absorbing axial forces, while at least one further row of rolling bodies, held at uniform intervals by a further bearing cage, being arranged between the outer disk and the inner ring and forming a third rolling bearing for absorbing radial forces,
   wherein the inner ring and the two circular-ring-shaped shaft disks are connected so that the inner ring and the two circular-ring-shaped shaft disks rotate together relative to the outer disk, thereby forming a common inner ring for the first, second and third roller bearings, and
   wherein the first rolling bearing and the second rolling bearing are formed by two tapered-roller bearings whose rolling bodies, which are designed as tapered rollers, are each aligned with their smaller end sides toward a bearing longitudinal axis.

2. The multi-row large rolling bearing of claim 1, wherein each row of the rolling bodies of the two tapered-roller bearings rolls in one raceway which is delimited by at least one rim and which is formed entirely either into an inner sides of the shaft disks or into an outer sides of the outer disk.

3. The multi-row large rolling bearing of claim 2, wherein the inner ring and the shaft disks are formed either by separate individual parts or the inner ring is formed in one piece with one shaft disk and the other shaft disk forms a separate component, with all the individual parts being connected to one another in a non-positively locking fashion either by means of screw connections or by means of clamping rings.

4. The multi-row large rolling bearing of claim 3, wherein, to set axial play of the first rolling bearing and the second roller bearing, one of the inner ring is formed with a defined width by means of grinding of at least one of its axial sides, and a spacer ring with a defined width is arranged between the inner ring and at least one of the shaft disks.

\* \* \* \* \*

UNITED STATES PATENT AND TRADEMARK OFFICE
CERTIFICATE OF CORRECTION

PATENT NO.       : 8,523,453 B2                                              Page 1 of 1
APPLICATION NO. : 12/597193
DATED            : September 3, 2013
INVENTOR(S)      : Loeschner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 957 days.

Signed and Sealed this
Fifteenth Day of September, 2015

Michelle K. Lee
*Director of the United States Patent and Trademark Office*